(No Model.)　　　　　　　　　　　　　　　　　2 Sheets—Sheet 1.
P. NEFF.
APPARATUS FOR MANUFACTURING LAMP BLACK.
No. 314,707.　　　　　　　　　Patented Mar. 31, 1885.
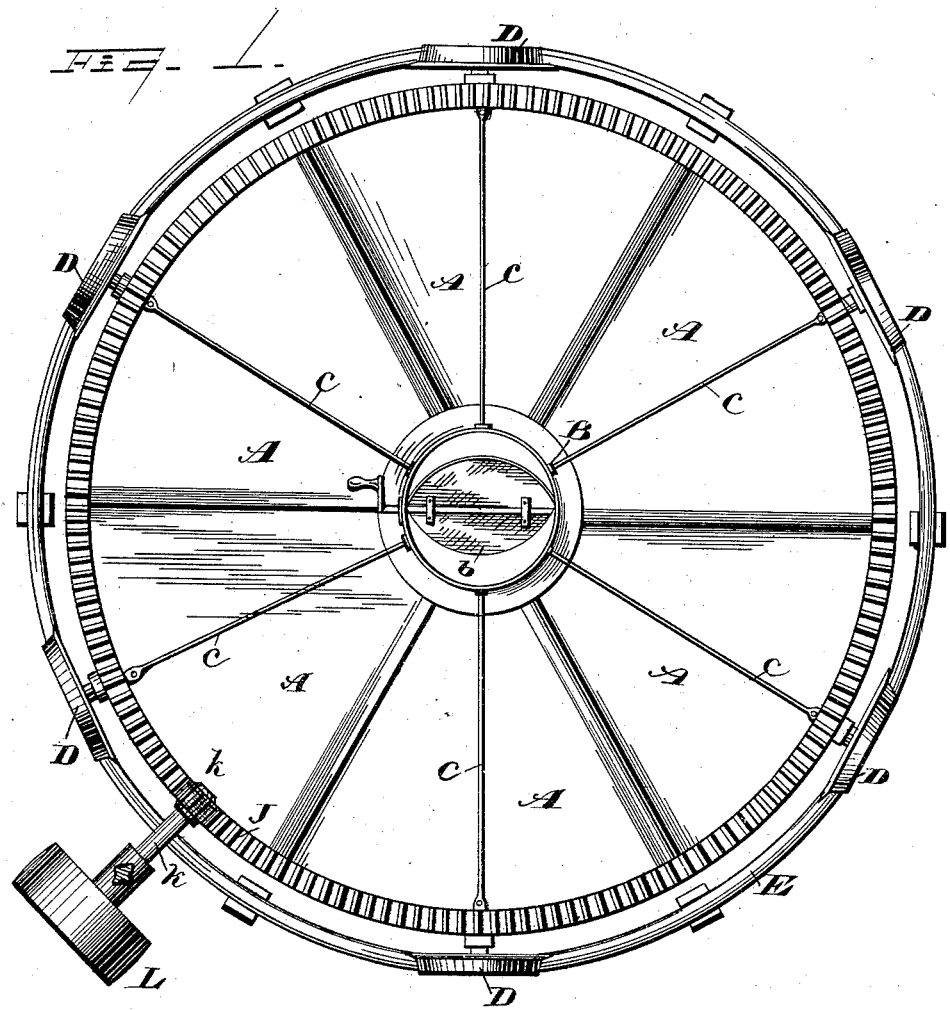
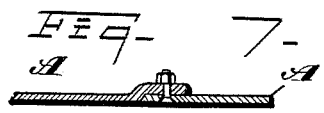
WITNESSES
INVENTOR (No Model.) 2 Sheets—Sheet 2.
P. NEFF.
APPARATUS FOR MANUFACTURING LAMP BLACK.
No. 314,707. Patented Mar. 31, 1885.
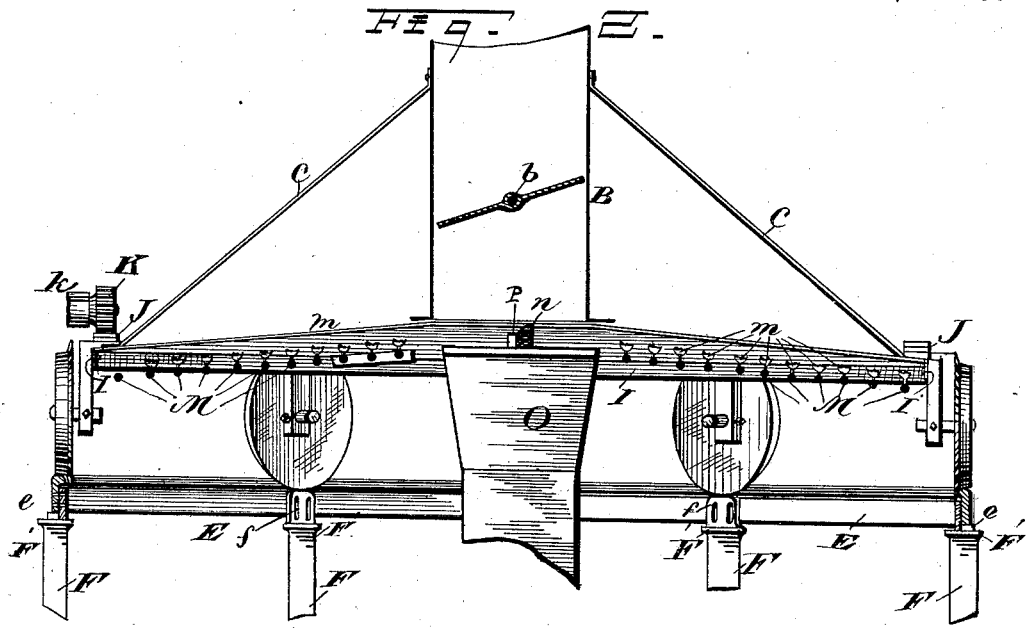
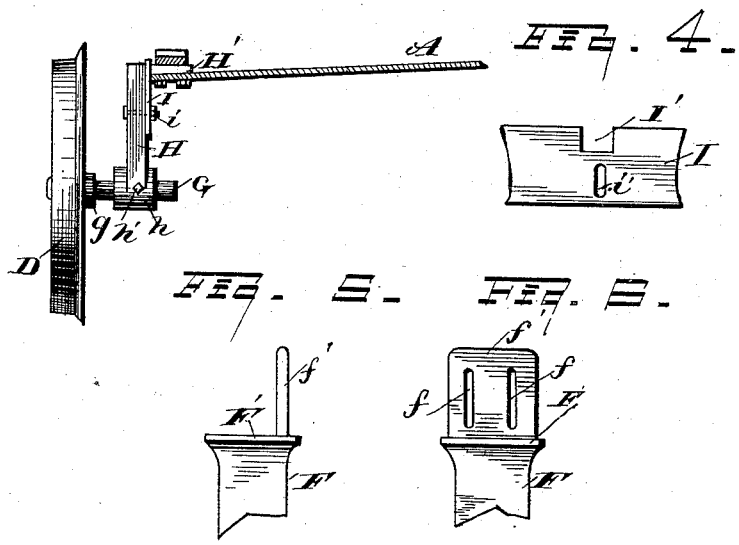
WITNESSES
Wm. M. Monroe.
Geo. J. King
INVENTOR
Peter Neff
by
Leggett & Leggett,
Attorneys.

UNITED STATES PATENT OFFICE.

PETER NEFF, OF GAMBIER, OHIO, ASSIGNOR TO PETER NEFF, JR., OF SAME PLACE.

APPARATUS FOR MANUFACTURING LAMP-BLACK.

SPECIFICATION forming part of Letters Patent No. 314,707, dated March 31, 1885.

Application filed June 19, 1884. (No model.)

*To all whom it may concern:*

Be it known that I, PETER NEFF, of Gambier, in the county of Knox and State of Ohio, have invented certain new and useful Improvements in Machines for the Manufacture of Lamp-Black; and I do hereby declare the following to be a full, clear, and exact description of the invention, such as will enable others skilled in the art to which it pertains to make and use the same.

My invention relates to improvements in machines for the manufacture of lamp-black, the object being to provide horizontally-rotating turn-tables mounted on flanged wheels that travel on a circular track, and provided with axles that may be adjusted radially with the track to compensate for the expansion of the table. A further object is to provide an adjustable band around the periphery of the table, that may be made to extend more or less below the edge of the table, as may be required. A further object is to support the track at a considerable height on columns, to the end that the under side of the table and the burners and mechanism connected therewith are accessible when the machine is in operation. A further object is to secure the track to the columns in such a manner and provided with suitable mechanism, to the end that the track may be adjusted vertically.

With these objects in view my invention consists in certain features of construction and in combination of parts hereinafter described, and pointed out in the claims.

In the accompanying drawings, Figure 1 is a plan view of my improved machine. Fig. 2 is a vertical section through the center of the same. Fig. 3 is an elevation of one of the supporting-wheels, axle, and arm, and in section a portion of one of the plates of the table and rack. Fig. 4 is a view in perspective of a portion of the adjustable band that encircles the table. Figs. 5 and 6 are elevations of the upper portion of the supporting-column. The one shows an edge and the other a side of the flange to which the track is attached. Fig. 7 is a transverse vertical section of a portion of two of the plates of the table, showing the manner of attaching them together.

A represents the metal plates, of which the table proper is constructed. The under side of these plates are slightly concaved in cross-section, and are made to overlap each other, and are secured, by bolts with countersunk heads, on the under side, as shown in Fig. 7. These plates are more or less inclined longitudinally, the inner ends being the highest, so that the table is slightly conical, and has a central opening, around the edges of which is secured the chimney B, provided with the damper $b$.

C are braces secured to the upper portion and the chimney, and to the outer portion of the plate A, as shown. The table is mounted on the flanged wheels D, that travel on the circular track E, that is supported by the column F. These columns are of sufficient length to elevate the track about six feet, more or less, to give access under the table. The track is usually of cast-iron, and made in sections, the ends of which meet about the center of a column, and are secured by bolts that pass through the elongated holes $f$ in the flanges $f'$ of the columns. With this construction, and by means of wedges $e$ under the ends of the sections of the track, and resting on the shoulders F' of the columns, the track may be easily adjusted to make it level. The wheels D are journaled on the axles G, that are provided with the collars $g$ inside of the wheels, and have an easy fit in the bore of the hub $h$ of the arm H, and are held endwise by the set screws $h'$. When these screws are loosened, the axles may be adjusted to make the flanges of the wheels fit the track. This is rendered necessary by the expansion of the table as it becomes heated by the burners beneath it. The arms H have each a laterally-projecting flange, H', that is bolted to the top of the plate A, as shown in Fig. 3.

I is a band that encircles the edge of the table, and is secured to the arms H by bolts $i$, that pass through elongated holes $i'$ in the band, by means of which and of the slots I', that embrace the flanges H', the band can be adjusted vertically, and be made to depend more or less below the edge of the table. By means of the pendent band or rim the products of combustion from the outer burners are prevented from deflection beyond the limits of the table; also, by this band and by more or less closing the damper $b$, the required depth of heated gases is had next to the surface of the table—a condition that is found to be favorable to the depositing of the lamp-black on the surface of the table.

J is a rack secured on top of the table, and is engaged by the pinion K, that is secured to the shaft k. This shaft is journaled in suitable boxes that are supported by hangers from the ceiling above or in any suitable manner. This shaft is provided with the pulley L, to which power is applied to revolve the table.

M are tubes provided with the burners m, that are arranged in such proximity to the table that the flames impinge against the under side of the table and deposit the lamp-black thereon, that, as the table revolves, is removed by the scrapers n and discharged into the receptacle O.

P is a bar, to which the scrapers are attached, and it, together with the tubes M, may be supported in any convenient manner, usually by a frame-work from below.

What I claim is—

1. The combination, with a circular track and a series of stationary burners and scrapers, of a horizontally-rotating table located above the burners and scrapers, a series of wheels connected to the periphery of and supporting the table, and mechanism for rotating the table, substantially as set forth.

2. The combination, with a horizontally-rotating table having a central chimney or draft-opening, of a track, a series of wheels supporting the table and moving on the track, and mechanism for rotating the table.

3. In a machine for the manufacture of lamp-black, the combination, with a conical horizontally-revolving table mounted on wheels that travel on a circular track, of a central chimney provided with a damper, substantially as set forth.

4. In a machine for the manufacture of lamp-black, the combination, with a horizontally-rotating table, of a band around the periphery of the table, and made adjustable vertically, so that it may be made to depend more or less below the table, substantially as set forth.

5. In a machine for the manufacture of lamp-black, the combination, with a horizontally-rotating table mounted on wheels traveling on a circular track, of axles so arranged that they may be adjusted radially with the track, substantially as set forth.

In testimony whereof I sign this specification, in the presence of two witnesses, this 31st day of May, 1884.

PETER NEFF.

Witnesses:
JOSEPH L. BALDWIN,
U. O. STEVENS.